US012174333B2

(12) United States Patent
Dorrough et al.

(10) Patent No.: US 12,174,333 B2
(45) Date of Patent: Dec. 24, 2024

(54) DISPLAY METHODS, TECHNIQUES, AND APPARATUS FOR INDICATING A CENTERLINE OF AN OBSCURED FEATURE

(71) Applicant: Franklin Sensors Inc., Meridian, ID (US)

(72) Inventors: David M. Dorrough, Eagle, ID (US);
Natalie A. Boehm, Meridian, ID (US);
Jay R. Paxman, Meridian, ID (US);
Daniel S. Toborg, Meridian, ID (US)

(73) Assignee: Franklin Sensors Inc., Meridian, ID (US)

( * ) Notice: Subject to any disclaimer, the term of this patent is extended or adjusted under 35 U.S.C. 154(b) by 97 days.

(21) Appl. No.: 17/964,628

(22) Filed: Oct. 12, 2022

(65) Prior Publication Data

US 2024/0125967 A1    Apr. 18, 2024

(51) Int. Cl.
*G01V 3/08*     (2006.01)
*G01N 27/22*    (2006.01)

(52) U.S. Cl.
CPC ............. *G01V 3/08* (2013.01); *G01N 27/226* (2013.01)

(58) Field of Classification Search
CPC . G01V 5/00; G01V 5/22; G01V 5/222; G01V 5/20; G01V 3/08; G01V 3/15; G01N 27/4473; G01N 21/958; G01N 23/223; G01N 33/5438; G01N 2035/0413; G01N 21/6452; G01N 27/02; G01N 27/22; G01N 27/221; G01R 29/0892; G01R 27/2608; G01R 27/26
See application file for complete search history.

(56) References Cited

U.S. PATENT DOCUMENTS

| | | | |
|---|---|---|---|
| 6,248,113 B1 * | 6/2001 | Fina .................... | A61B 17/221 606/127 |
| 7,116,091 B2 | 10/2006 | Miller | |
| 8,669,772 B2 * | 3/2014 | Dorrough ............. | G01R 27/26 324/67 |
| 8,836,347 B2 * | 9/2014 | Dorrough ............... | G01V 3/15 324/67 |
| 9,228,969 B2 * | 1/2016 | Dorrough .......... | G01R 27/2605 |

(Continued)

OTHER PUBLICATIONS

Zircon OneStep Stud Center Indicator, 3 pages, Jul. 1, 2022.

*Primary Examiner* — Vinh P Nguyen
(74) *Attorney, Agent, or Firm* — Foley & Lardner LLP

(57) ABSTRACT

Method, techniques, and apparatus of providing obscured feature detection. The disclosed embodiments provide an obscured feature detector to be placed on a surface to detect an obscured feature obscured by the surface, the obscured feature detector having a plurality of sensor plates arranged in an array. Measurements, via a sensing circuit, of capacitance readings sensed by the sensor plates in a plurality of regions are taken, each region corresponding to an area surrounding one or more of the at least three sensor plates. A comparison is made of the sensed capacitance readings in different regions using a controller coupled to the sensing circuit. The controller identifies an edge of the obscured feature and a centerline of the obscured feature, based on the comparison of the sensed capacitance readings. The controller activates an edge indicator to indicate proximity to the edge of the obscured feature and a centerline indicator to indicate the centerline of the obscured feature.

21 Claims, 9 Drawing Sheets

(56) References Cited

U.S. PATENT DOCUMENTS

| | | | |
|---|---|---|---|
| 10,895,657 B2* | 1/2021 | Dorrough | G01V 3/088 |
| 11,246,432 B2* | 2/2022 | Sergyeyenko | A47G 1/24 |
| 11,686,875 B2* | 6/2023 | Rubens | F21V 9/08 |
| | | | 324/67 |
| 11,921,143 B2* | 3/2024 | Dorrough | G01R 19/15 |

* cited by examiner

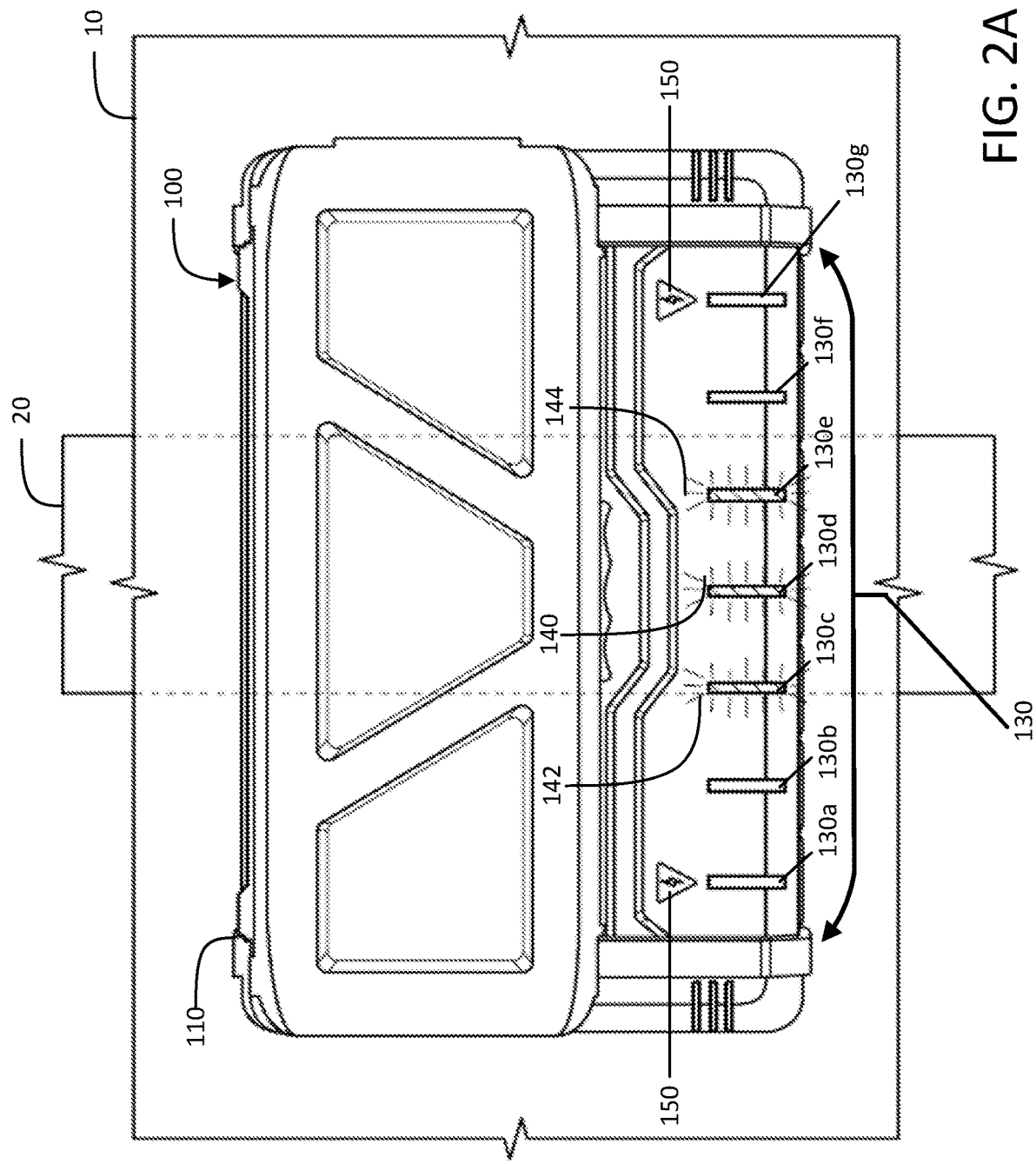

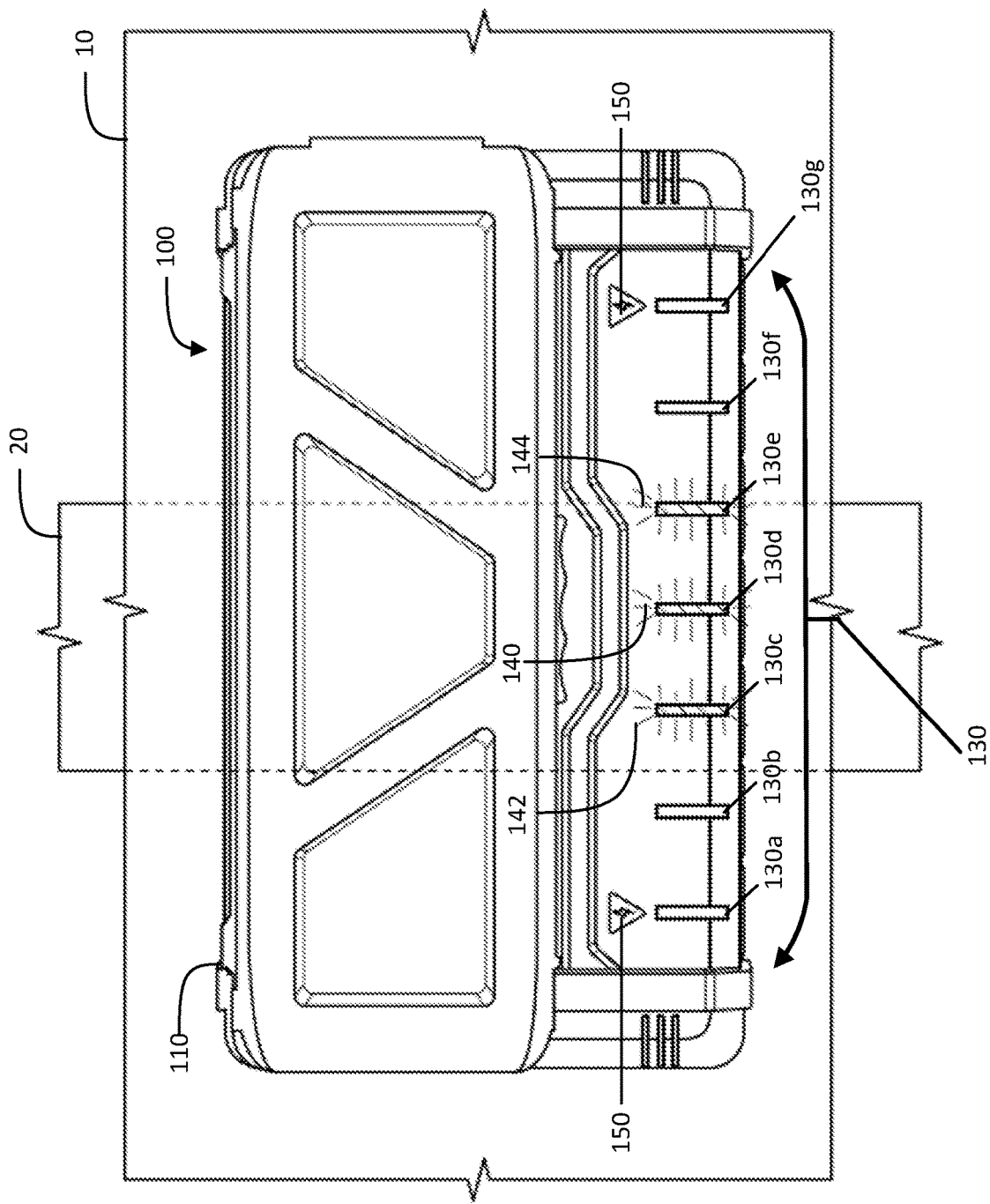

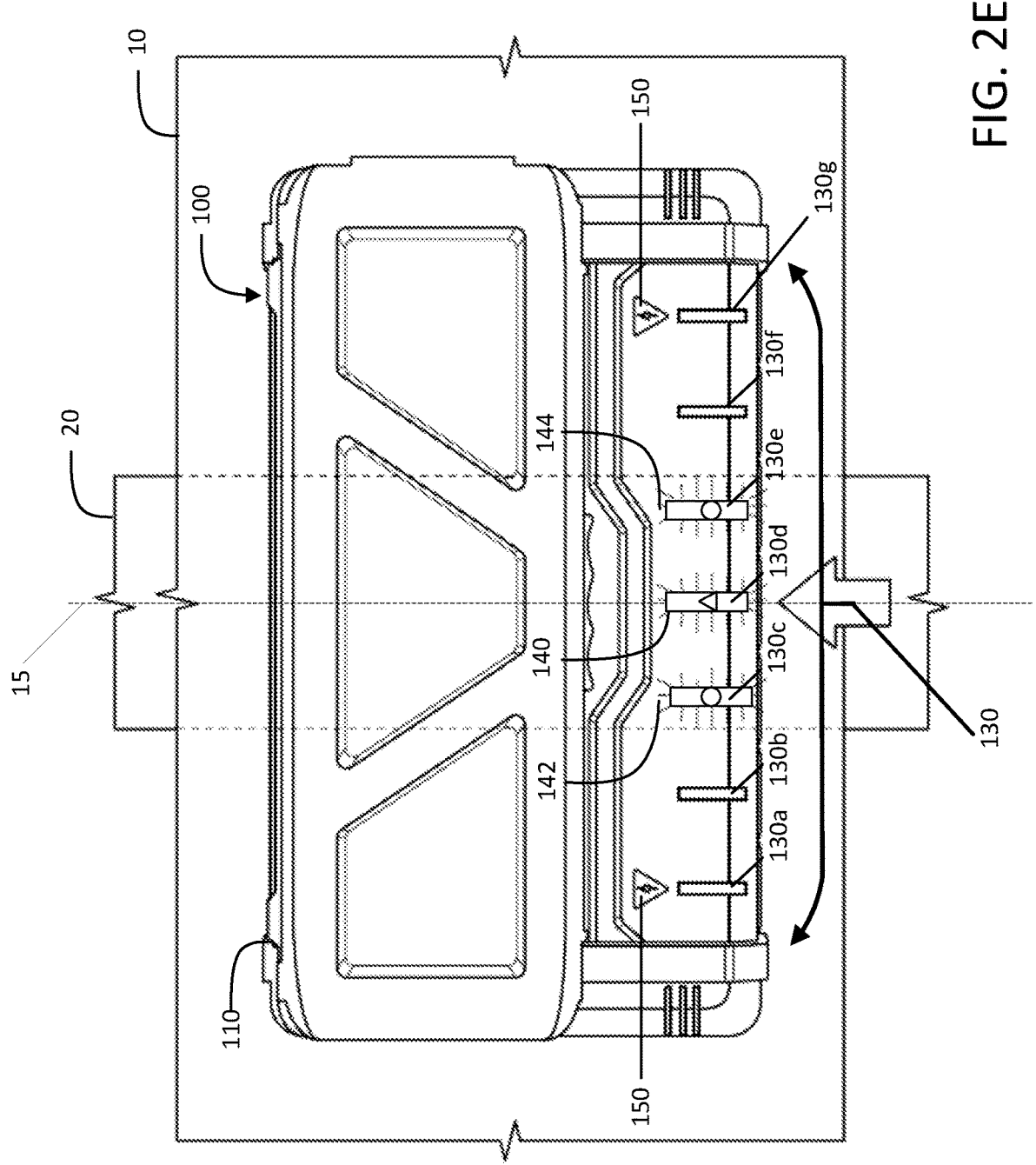

DISPLAY METHODS, TECHNIQUES, AND APPARATUS FOR INDICATING A CENTERLINE OF AN OBSCURED FEATURE

TECHNICAL FIELD

The present disclosure is generally directed to devices to detect a presence of an obscured feature behind an obscuring material or surface, and more directly to displays for devices to locate obscured features such as beams or studs behind or within walls, ceilings, etc., and joists beneath and/or within floors.

BACKGROUND

Presently, locating obscured, underlying, support, and/or concealed (hereafter, and without limiting the present disclosure, may be collectively referred to as "obscured") features, such as beams, studs, joists, architectural features, and so forth behind and/or within walls, ceilings, or floors is a common problem encountered during construction, repair, renovation, and similar activities. For example, it may be desirable to cut or drill into a wall, a ceiling, a floor, or other supported surface (hereafter, and without limiting the present disclosure, may be referred to as "wallboard") with an aim of creating an opening in the wallboard while avoiding the obscured features. Knowing where the obscured features are positioned before beginning work can be desirable to avoid cutting or drilling into, or otherwise affecting such obscured features. As another example, it may be desirable to anchor an object, such as a picture frame, a shelf, and so forth to a support feature that may obscured by a wallboard. In such a case, a user (e.g., a person, a house owner, a carpenter, a contractor) may desire to install a fastener through the wallboard in alignment with, affixing to, or engaging the support feature that may visually obscured by the wallboard.

A variety of techniques have been employed with limited or some success to address the problem of locating the featured that may be obscured by a wallboard. One such technique involves a person driving small pilot nails through the wallboard at various locations until an obscured feature is encountered. The person may then need to cover over the holes that do not reveal the location of the obscured support feature.

A less destructive technique includes the person tapping on the wallboard while listening to a resulting sound in an effort for the person to detect audible variations in the resulting sound that may suggest a presence of an obscured feature. This technique may often prove ineffective because the technique relies on a subjective judgement of the person who is tapping the wallboard. Further, variations in material composing the wallboard and any covering material (wall covering), thickness of the wallboard (and variations in material and thickness therein) and wall covering, etc. may make the technique unreliable in detecting the obscured feature.

Some current methods may employ magnetic detectors to find an obscured support features. Magnetic detectors, however, often rely on a presence of metallic fasteners, such as screws, staples, nails, and so forth to enable a trigger response of the magnetic detector.

Another current method may include the use of electronic detectors that may sense changes in a capacitance of the wallboard (and any wall covering, etc.) by presuming that the changes in the capacitance may result due to an obscured support feature. These electronic detectors may lack the ability to compensate for changes in the capacitance that may result from variations in the material and/or thickness of the wallboard (and wall covering), the presence of non-support features behind the obscuring material, and/or other factors.

Another current method may include the use of a radar technology. However, using the radar technology to locate an obscured feature that may be behind a relatively thick material (e.g., the thickness of the wallboard) may also be unreliable. Furthermore, a device that employs the radar technology to locate the obscured feature may be considerably costly and may be unaffordable to some people.

Compounding the foregoing issues, in addition to the location of the obscured feature, the person may also need more granular information regarding the obscured feature, such as an approximate width of the obscured feature, the edges of the obscured feature, and the center of the obscured feature. Of particular interest, it is desirable to use an apparatus that can detect the center of the obscured feature with considerable accuracy.

SUMMARY

The present disclosure describes methods, techniques, and apparatus for indicating obscured features more accurately, and for indicating a centerline of an obscured feature with considerable accuracy.

BRIEF DESCRIPTION OF THE FIGURES

The present embodiments will become more fully apparent from the following description and appended claims, taken in conjunction with the accompanying drawings. Understanding that the accompanying drawings depict only typical embodiments and are, therefore, not be considered limiting of the scope of the disclosure, the embodiments will be described and explained with specificity and detail in reference to the following accompanying drawings.

FIG. 2A is a first plan view of the OFD of FIG. 1 disposed at a supported surface, according to an example embodiment.

FIG. 2C is a third plan view of the OFD of FIG. 1 disposed at a supported surface, according to an example embodiment.

FIG. 2E is a fifth plan view of the OFD of FIG. 1 disposed at a supported surface, according to an example embodiment.

DETAILED DESCRIPTION

Figure 1:
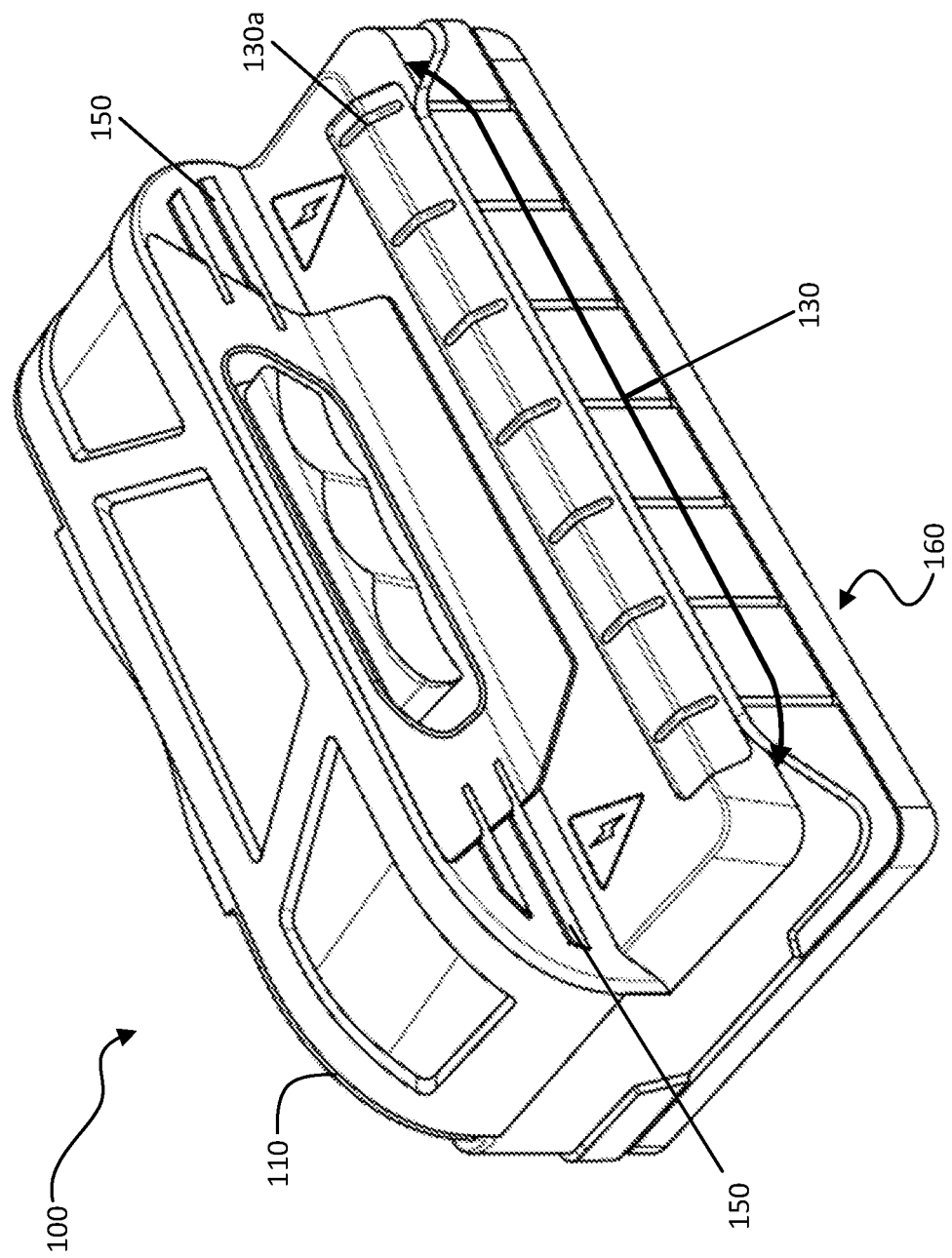
FIG. 1 is a perspective view of an obscured feature detector (OFD), according to an embodiment of the present disclosure.

Presently available obscured feature detectors (OFDs) generally employ a visual signal, such as one or more light-emitting diodes (LEDs), a liquid-crystal display (LCD) module, etc. These obscured feature detectors employ such LEDs or LCDs in a binary mode; meaning, the display element (whether LED or LCD) is either on or off, suggesting, respectively, the presence or absence of an obscured feature. Furthermore, manufacturers calibrate obscured feature detectors to a single threshold relative to a signal strength from a sensor (or sensor array). That is to say, the OFD may be calibrated to a particular sensitivity selected by the manufacturer, and the sensitivity selection may range from high to low. Typically, OFDs may be calibrated to detect the general location of obscured features. For example, OFDs may generally be calibrated to indicate (e.g., by activating one or more visual signals and or auditory signals) when passing over an obscured feature (e.g., a stud) but may not indicate a precise location of the obscured feature (e.g., when the OFD is directly over a centerline of the obscured feature). Thus systems and methods for determining the precise location of the obscured feature may be desired.

The present disclosure provides methods, techniques, and apparatus for indicating obscured features and more precisely indicating positioning over a centerline of the obscured feature. The obscured feature may include a plumbing element, a duct, a wiring element, a support member such as a stud, etc.

One embodiment relates to an obscured feature detector. The obscured feature detector includes: a plurality of sensor plates, each having a capacitance that varies based on the proximity of the sensor plate to one or more adjacent objects and a material property of the one or more adjacent objects; a sensing circuit coupled to the plurality of sensor plates, the circuit being configured to measure the capacitances of each of the sensor plates; a plurality of indicators, each indicator capable of being toggled between a deactivated state and an activated state; and a controller coupled to the sensing circuit, the controller configured to analyze the capacitances measured by the sensing circuit to indicate proximity of the obscured feature detector to an obscured feature and to identify a location of a centerline of the obscured feature, wherein the controller is also coupled to the plurality of indicators, the controller to toggle one or more of the plurality of indicators to a first activated state to indicate detection of an obscured feature (e.g., a proximity of the obscured feature detector to the obscured feature) and to toggle another indicator of the plurality of indicators to a second activated state to indicate the centerline of the obscured feature.

Another embodiment relates an obscured feature detector. The obscured feature detector includes: a plurality of sensor plates, each having a capacitance that varies based on the proximity of the sensor plate to one or more adjacent objects and a material property of the one or more adjacent objects; a sensing circuit coupled to the plurality of sensor plates, the circuit being configured to measure the capacitances of each of the sensor plates; a plurality of indicators, each indicator capable of being toggled between a deactivated state and an activated state; a controller coupled to the sensing circuit, the controller to analyze the capacitances measured by the sensing circuit to identify the location of an obscured feature; the controller also coupled to the plurality of indicators, the controller to toggle the indicators that are located in front of the obscured feature to an activated state to indicate proximity of the obscured feature detector to the first edge of the obscured feature and the controller also coupled to a centerline indicator, the controller to toggle the centerline indicator to an activated state when the obscured feature detector is centered on the obscured feature detector.

Another embodiment relates to a method. The method includes: providing an obscured feature detector to be placed on a surface to detect an obscured feature obscured by the surface, the obscured feature detector having a plurality of sensor plates arranged in an array; measuring, via a sensing circuit, capacitance readings sensed by the sensor plates in a plurality of regions, each region corresponding to an area surrounding one or more of the at least three sensor plates; comparing, by a controller, the sensed capacitance readings in different regions using a controller coupled to the sensing circuit; identifying, via the controller, an edge of the obscured feature and a centerline of the obscured feature, based on the comparison of the sensed capacitance readings; and, activating, via the controller, an edge indicator to indicate proximity to the edge of the obscured feature and a centerline indicator to indicate the centerline of the obscured feature.

As used herein, the term "wallboard" refers to an architectural element of a wall, a floor, a ceiling, a half-wall, a partition, etc., which is affixed to a support feature, and includes any wall covering (e.g., wallpaper, veneer, paint, tile, etc.). A wallboard may comprise wood, a manufactured wood product (e.g., particle board, chip board, plywood, fiberboard, etc.), gypsum, SHEETROCK®, lath-and-plaster, cement board, plastic, etc.

As used herein, the phrase "support feature" refers to an architectural element that supports, or is a comprising member of a wall, a half-wall, a partition, a floor, a ceiling, etc. Examples of a support feature are, without limitation, a stud, a king stud, a jack (or trimmer) stud, a cripple stud, a header, a stringer, a beam, a joist, a rafter, a collar tie, blocking, nogging, etc.

As used herein, the phrase "obscured feature" refers to an element, such as, e.g., a support feature, an electrical box, electrical wiring, a duct, a plumbing component, etc., that is behind or within, or partially behind and partially within an architectural feature comprising a wallboard such that the obscured feature is not readily visible from the working side of the wallboard without deconstruction or partial deconstruction of the architectural feature.

As used herein, the phrase "working side" refers to an exposed face of a wallboard (or a covering of an architectural feature) which can be accessed with a tool or a hand without first deconstructing or partially deconstructing the wallboard, and from which it is desired to perform some work that engages the wallboard, a support feature, or an obscured feature within/behind the wallboard. By way of non-limiting example, the working side may be an exposed portion of an interior wall whereupon one wishes to hang a picture, and the interior wall is disposed between two interior rooms such that the working side is (a) not within the wall and (b) is on the face of the wall where the picture is to be hung (i.e., not on a face of the wall in the "other" room).

FIG. 1 illustrates an isometric and/or perspective view of an obscured feature detector (OFD) 100, according to an embodiment of the present disclosure. FIG. 1, and other figures of this disclosure, may not illustrate and/or describe an exact embodiment of the OFD 100. Furthermore, FIG. 1 and the other figures may not be drawn to scale. Specifically, a manufacturer may make changes and/or modifications to a shape and/or dimensions of the OFD 100. Furthermore, the manufacturer may add more features to the OFD 100, and/or may remove some features of the OFD 100. Therefore, the description of FIG. 1 and any other figure should not be taken in limiting sense.

Regardless of any changes and/or possible variations to FIG. 1, the OFD 100 includes a housing 110 and a variable output display 130. The variable output display 130 may utilize a plurality of light-emitting diodes (LEDs), of which a first LED 130a is identified. The variable output display 130 may be configured to render a variable output based on an input(s) from one or more of sensor plates (or elements) of a sensor array 160.

To provide some context for the disclosure, it may be useful to briefly discuss how the OFD 100 may use capacitance measurements to detect an obscured feature. In some aspect, the capacitance is a ratio of an amount of electric charge that may be stored on a conductor (e.g., a sensor plate) due to a difference in an electric potential. Calculating the capacitance of a capacitor partly depends on a type, a shape, a technology, a process node, and so forth of the capacitor. For example, Equation 1 illustrates a general form equation of a capacitance of a parallel-plate capacitor.

$$C = \varepsilon \cdot \frac{A}{d} \quad \text{Equation 1}$$

In Equation 1, C denotes the capacitance of the parallel-plate capacitor, and C may be measured and/or expressed in Farad (F), or a derivative thereof, such as pF, nF, and so forth. Continuing with Equation 1, $\varepsilon$ denotes a complex permittivity that may be measured and/or expressed in Farads per meter (F/m). Further, $\varepsilon$ may be a product of the permittivity of free space ($\varepsilon_0$) and a relative permittivity ($\varepsilon_r$), where $\varepsilon_0 = 8.854 \cdot 10^{-12}$ F/m, and $\varepsilon_r$ is a constant that is greater or equal to one (1). The value of $\varepsilon_r$ depends on a dielectric (or a type of medium) between two plates of the parallel-plate capacitor. For example, if the medium is vacuum, then $\varepsilon_r = 1$. As another example, if the medium is air, then $\varepsilon_r = 1.0006$. Generally, if the medium is a non-conductive material, $\varepsilon_r$ is greater than one (1). Also, a better insulating material is directly (instead of inversely) proportional to the value of $\varepsilon_r$. Mathematically, the complex permittivity may be expressed as $\varepsilon = \varepsilon_0 \cdot \varepsilon_r$. Continuing with Equation 1, A denotes an area overlap of the two plates of the parallel-plate capacitor, and A may be measured and/or expressed in square meters (m 2), or a derivative thereof, such mm², μm², and so forth. Finally, d denotes a separation (or distance) between the two plates of the parallel-plate capacitor, and d may be measured and/or expressed in meters (m), or a derivative thereof, such as mm, μm, and so forth.

Figure 3:
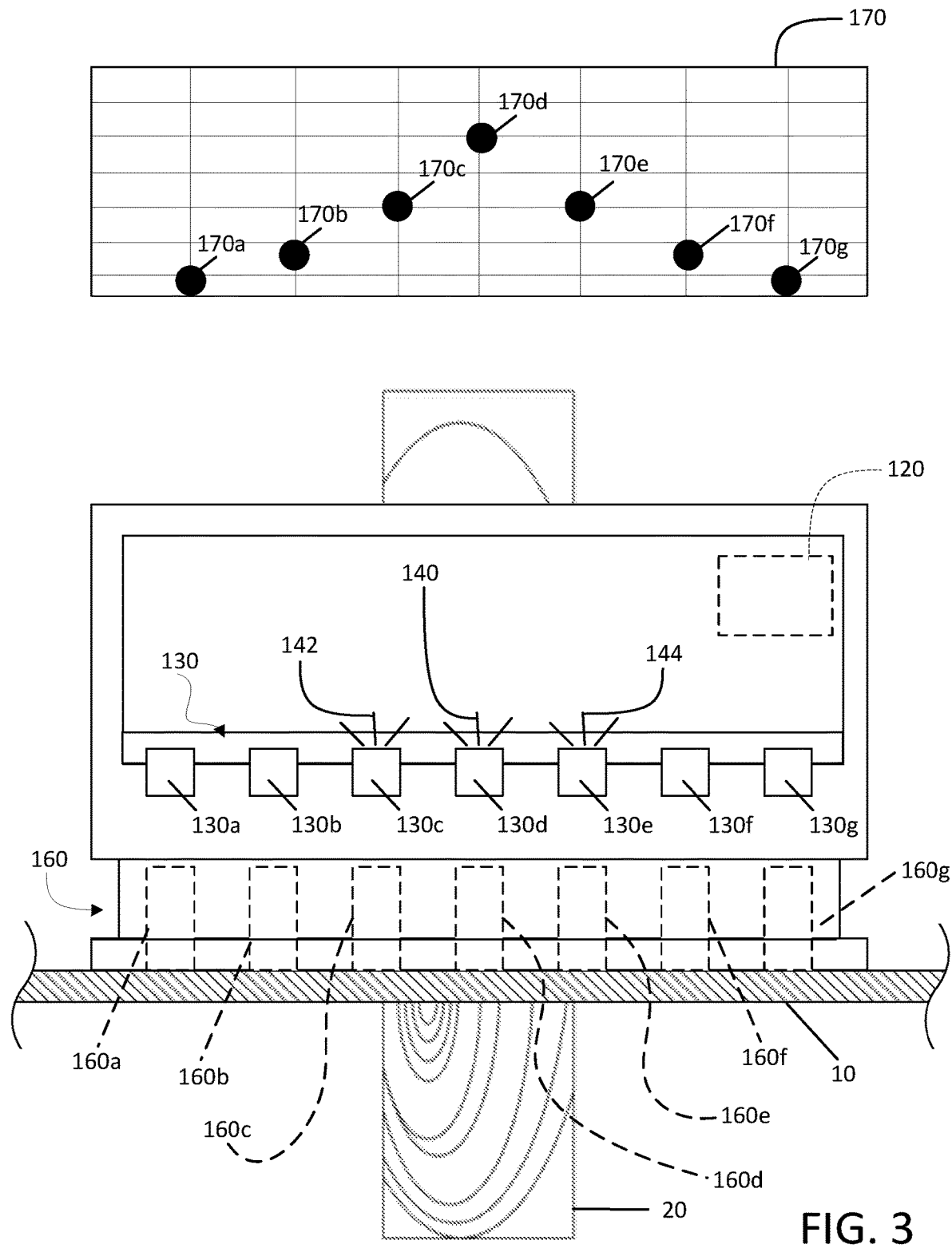
FIG. 3 is a fourth top view of the OFD of FIG. 1, along with a power table, according to an example embodiment.

In some embodiments, the sensor array 160 may utilize single-plate capacitive sensors, where the single-plate capacitive sensors utilize only the sensor plates of the sensor array 160 that are embedded in the OFD 100 (not visible in the perspective view of FIG. 1, but see FIG. 3). In more detail, each sensor plate of the sensor array 160 utilizes the environment around the sensor plates as the dielectric (or medium) of the sensor array 160. The sensor array 160 may assume each sensor plate is a first sensor plate and can form a first capacitor with a corresponding second sensor plate that is infinitely far away (e.g., d→∞) from the first sensor plate. Further, each sensor plate of the sensor array 160 can form a second capacitor with another sensor plate of the sensor array 160. Nevertheless, unlike what is suggested by Equation 1, when each sensor plate of the sensor array 160 forms the second capacitor with the other sensor plate of the sensor array 160, both sensor plates are positioned against a wallboard. Therefore, the first and the second sensor plates are not facing each other. For example, the first and the second sensor plates of the sensor array 160 may be adjacent to each other. As another example, the first sensor plate may be to the left of a third sensor plate, and the second sensor plate may be to the right of the third sensor plate. As yet another example, the first sensor plate may at a first end of the sensor array 160, and the second sensor plate may be at a second end of the sensor array 160. The OFD 100 includes AC slit lights 150 which indicate when the OFD 100 is turned on.

FIG. 2A is a first top view of the OFD 100 of FIG. 1 disposed at a supported surface 10. Hereafter, for convenience of the disclosure and without limitation, the supported surface 10 is referred to as a "wallboard" though the supported surface 10 may be any suitable surface or material behind which features may be obscured and thereby amenable to detection. The wallboard 10 is depicted cut away to partially expose a support feature 20. The OFD 100 comprises the housing 110 to house the variable output display 130. The variable output display 130, in the present embodiment, comprises a plurality of LEDs 130a-130g.

The OFD 100 is positioned at the wallboard 10 such that the LED 130h is centered, or nearly centered, over the support feature 20. The LEDs 130c, 130d, 130e are shown disposed over the support feature 20. The LED 130d, disposed most centrally over the support feature 20, has a luminance 140. In the embodiment shown in FIG. 2, the OFD 100 is not precisely over or otherwise centered over the support member 20. Therefore, each of the LEDs 130c, 130d, and 130e has a luminance in a first color. The remaining LEDs 130a-130b, 130f-130g are shown with no luminance. The lack of luminance from the LEDs 130a-130b, 130f-130g indicates no obscured feature is detected at these locations. The luminance of the LEDs 130c-130e indicates detection of, and therefore a proximity to and the presence of, a detected obscured feature 20 in the location spanned by these LEDs 130c-130e. In this manner of varying levels and colors of luminance, the LEDs 130a-130g are each an example of a variable output display element, according to one embodiment of the present disclosure, which individually and collectively provide variability to the variable output display 130 to display for a user greater information about what the sensor array 160 is detecting.

In one embodiment, any of the LEDs 130a-130g may emit no luminance when not disposed over or near the obscured feature 20. In one embodiment, the LEDs 130a-130g may have a particular low (or baseline) luminance when not disposed over or near the obscured feature 20 to signal that the OFD 100 is energized, and a luminance of any of the LEDs 130a-130g to indicate detection of the obscured feature 20 to any degree is perceptibly greater than the baseline luminance. In some embodiments, the AC slit lights 150 may display a luminance to indicate that the OFD 100 is energized. While the OFD 100 is shown with 6 LEDs 130a-130g, this is for convenience of the present disclosure and not by way of limitation. The present disclosure includes a display 130 of the OFD 110 having fewer or more LEDs 130a-130g. Furthermore, while reference in the present embodiment is to a display 130 comprising LEDs 130a-130g, this is not intended to limit the disclosure. The present disclosure anticipates display elements other than LEDs, such as, e.g., a liquid crystal display (LCD) module, etc. The present disclosure anticipates that the variable output display 130 may be arranged in a different manner than that shown in FIGS. 1 and 2, such as, e.g., where each LED 130a-130g is illustrated, a column of two or more LEDs may be disposed, and the number of LEDs energized (and, in an embodiment, the luminance 140, 142, 144 of the LEDs) in a given column corresponds to a detection of an obscured feature.

Figure 2B:
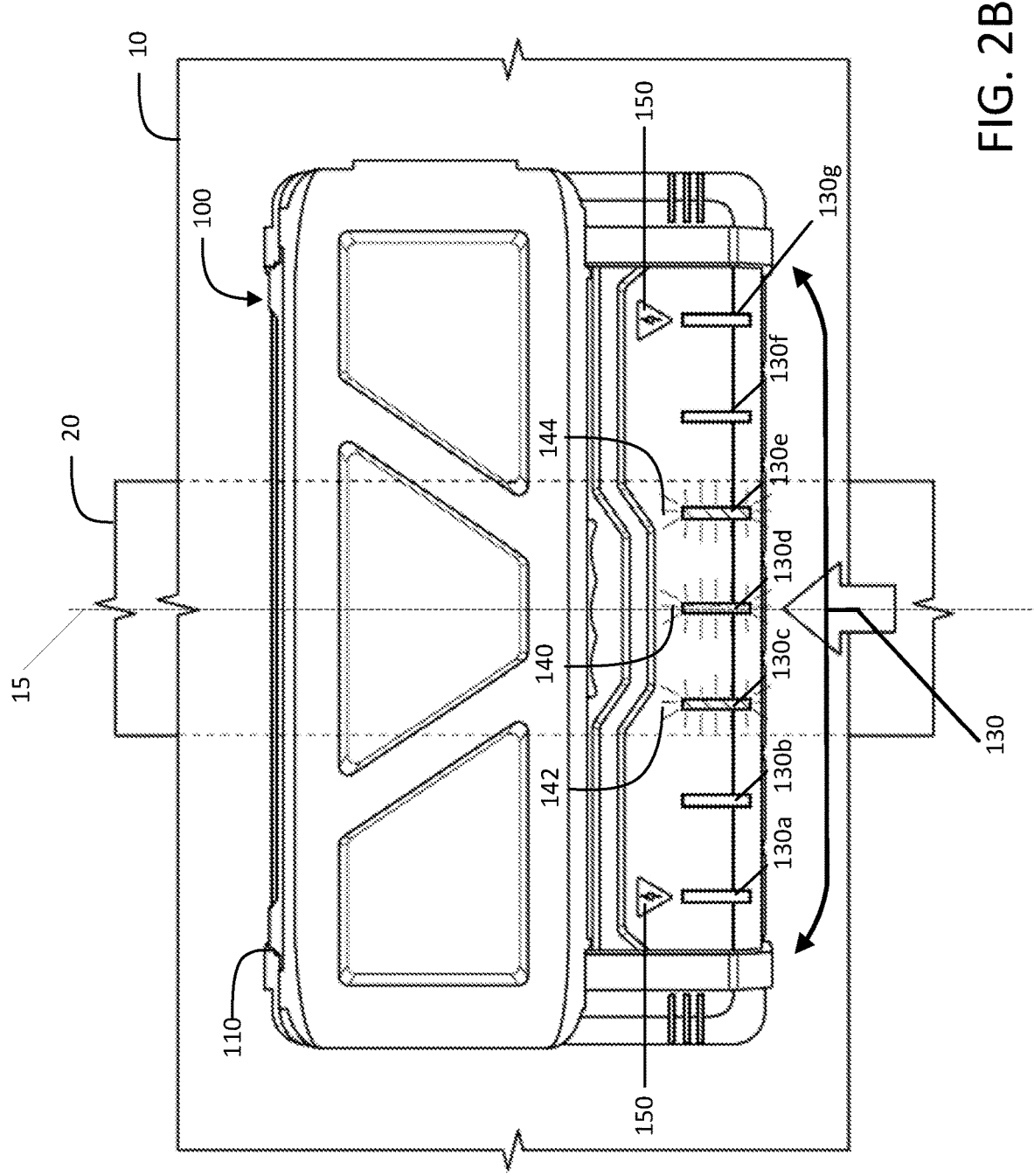
FIG. 2B is a second plan view of the OFD of FIG. 1 disposed at a supported surface, according to an example embodiment.

FIG. 2B is a second top view of the OFD 100 of FIG. 1 disposed at a supported surface (wallboard 10). The top view shown in FIG. 2B is very similar to the top view shown in FIG. 2A and described above. As described above, the OFD 100 is positioned at the wallboard 10 such that the LED 130h is centered, or nearly centered, over the support feature 20. The LED 130d, disposed precisely over a centerline 15 (or the center of a width) of the support feature 20, has a luminance 140. Since the OFD 100 is disposed directly over the centerline 15 of the support feature 20, the luminance 140 will be in a first color (e.g., green). The LEDs 130c and 130e are also disposed over the support member. However, they are not disposed directly over the centerline 15 of the support feature 20. The LEDs 130c and 130e each have a luminance of 142 and 144 respectively in a second color (e.g., red, yellow, etc.) because they are not directly over the centerline 15 of the support member 20. The LEDs 130c and 130e simply indicate proximity to (or detection of) the detected support member 20. The remaining LEDs 130a-130b, 130f-130g are shown with no luminance. The lack of luminance from the LEDs 130a-130b, 130f-130g indicates no obscured feature is detected at these locations. The luminance of the LEDs 130c-130e indicates the presence of a detected obscured feature 20 in the location spanned by these LEDs 130c-130e. In this manner of varying levels and colors of luminance, the LEDs 130a-130g are each an example of a variable output display element, according to one embodiment of the present disclosure, which individually and collectively provide variability to the variable output display 130 to display for a user greater information about what the sensor array 160 is detecting.

FIG. 2C is a third top view of the OFD 100 of FIG. 1 disposed at the supported surface (wallboard 10). The top view shown in FIG. 2C is very similar to the top view shown in FIG. 2A and described above. The LEDs 130c, 130d, 130e are shown disposed over the support feature 20. The LED 130d, disposed most centrally over the support feature 20, has a luminance 140. In FIG. 2C, the OFD 100 is not precisely over the support member 20. Therefore, each of the LEDs 130c, 130d, and 130e has a luminance in the same first color (e.g., red, yellow, etc.). The remaining LEDs 130a-130b, 130f-130g are shown with no luminance. The lack of luminance from the LEDs 130a-130b, 130f-130g indicates no obscured feature is detected at these locations. The luminance of the LEDs 130c-130e indicates detection of (e.g., a proximity to), and therefore the presence of, a detected obscured feature 20 in the location spanned by these LEDs 130c-130e. In this manner of varying levels and colors of luminance, the LEDs 130a-130g are each an example of a variable output display element, according to one embodiment of the present disclosure, which individually and collectively provide variability to the variable output display 130 to display for a user greater information about what the sensor array 160 is detecting.

Figure 2D:
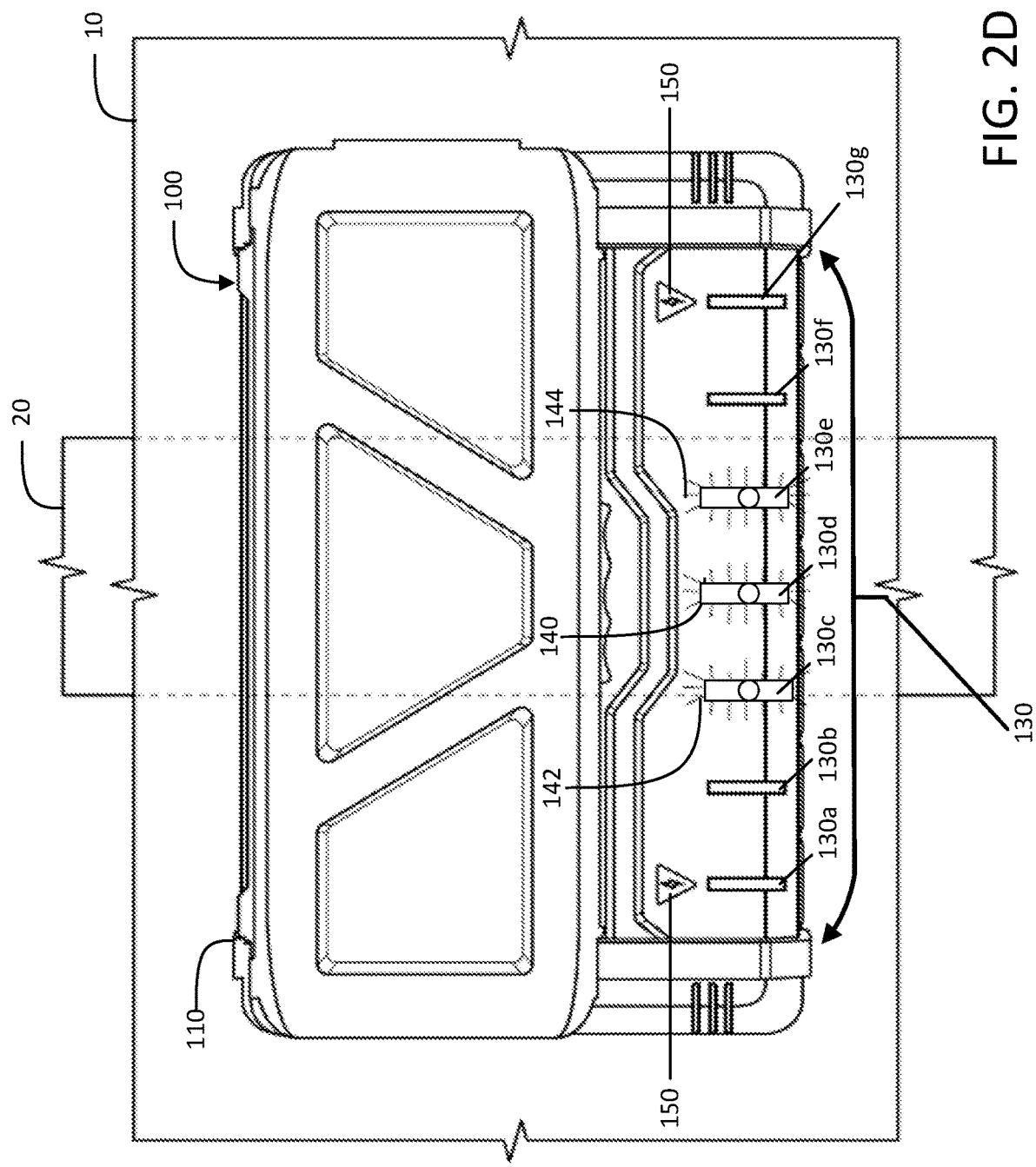
FIG. 2D is a fourth plan view of the OFD of FIG. 1 disposed at a supported surface, according to an example embodiment.

FIG. 2D is a fourth top view of the OFD 100 of FIG. 1 disposed at the supported surface (wallboard 10). The top view shown in FIG. 2D is very similar to the top view shown in FIG. 2A and described above. The LEDs 130c, 130d, 130e are shown disposed over the support feature 20. The LED 130d, disposed most centrally over the support feature 20, has a luminance 140. In FIG. 2D, the OFD 100 is not precisely over the support member 20. Therefore, each of the LEDs 130c, 130d, and 130e has a luminance in the same first shape (e.g., circles etc.). The remaining LEDs 130a-130b, 130f-130g are shown with no luminance in any particular shape. The lack of luminance in any particular shape from the LEDs 130a-130b, 130f-130g indicates no obscured feature is detected at these locations. The luminance of the LEDs 130c-130e indicates detection of (e.g., a proximity to), and therefore the presence of, a detected obscured feature 20 in the location spanned by these LEDs 130c-130e. In this manner of varying shapes of luminance, the LEDs 130a-130g are each an example of a variable output display element, according to one embodiment of the present disclosure, which individually and collectively provide variability to the variable output display 130 to display for a user greater information about what the sensor array 160 is detecting.

FIG. 2E is a fourth top view of the OFD 100 of FIG. 1 disposed at a supported surface 10 (wallboard 10). The top view shown in FIG. 2E is very similar to the top view shown in FIG. 2A and described above. As described above, the OFD 100 is positioned at the wallboard 10 such that the LED 130h is centered, or nearly centered, over the support feature 20. The LED 130d, disposed precisely over a centerline 15 (or the center of a width) of the support feature 20, has a luminance 140. Since the OFD 100 is disposed directly over the centerline 15 of the support feature 20, the luminance 140 will be in a first shape (e.g., triangle). The LEDs 130c and 130e are also disposed over the support member. However, they are not disposed directly over the centerline 15 of the support feature 20. The LEDs 130c and 130e each have a luminance of 142 and 144 respectively in a second shape (e.g., circle, etc.) because they are not directly over the centerline 15 of the support member 20. The LEDs 130c and 130e simply indicate detection of (e.g., a proximity to) the detected support member 20. The remaining LEDs 130a-130b, 130f-130g are shown with no luminance. The lack of luminance from the LEDs 130a-130b, 130f-130g indicates no obscured feature is detected at these locations. In this manner of varying shapes of luminance, the LEDs 130a-130g are each an example of a variable output display element, according to one embodiment of the present disclosure, which individually and collectively provide variability to the variable output display 130 to display for a user greater information about what the sensor array 160 is detecting.

FIG. 3 is a fourth top view of the OFD 100 of FIG. 1, according to an embodiment of the present disclosure, along with a power table 350. The OFD 100 is shown, diagrammatically, as if disposed against a wallboard 10 and over an obscured feature 20. The OFD 100 comprises a controller 120, the display 130, and a sensor array 160. As described above, the variable output display 130 comprises the plurality of LEDs 130a-130q. The sensor array 160 comprises a plurality of discrete sensor elements 160a-160q. In some embodiments, each LED 130a-130q corresponds to a respective sensor element 160a-160q. Each corresponding sensor element 160a-160q may couple to its respective LED 130a-130q at or through the controller 120. The controller 120 may activate (and may modulate or otherwise vary) the variable output display elements (the LEDs 130a-130q) to drive display of an indication of the strength of a capacitance sensor reading from one or more of the sensor elements 160a-160q. The controller 120 is electrically coupled to each of the sensor elements 160a-160q and to each of the LEDs 130a-130q. The controller 120 may receive in real time from each sensor element 130a-130q a signal having a signal strength or magnitude based on a proximity to the obscured feature 20, as well as the composition, density, etc., of the obscured feature and the overlying wallboard 10. The controller 120 may, based on the signal strength from each sensor element 160a-160q, cause a corresponding signal to be sent to each respective LED 130a-130q, thereby causing each LED 130a-130q to become energized at a particular state to generate a corresponding luminance 140-144. In some embodiments, the controller may cause each respective LED 130a-130q to become energized so as cause the LEDs 130a-130q to emit luminance of a certain brightness and/or color based on the signal received from each sensor element. For example, if the OFD 100 is placed directly over the center of the obscured feature 20 as determined by the sensor elements 160c-160e, the LEDs 130c-130e may be energized so that LEDs 130c and 130 may have a luminance 142 and 144 in a first color and/or brightness while the LED 130d may have a luminance 140 in a second color and/or brightness to indicate that the OFD 100 is directly over obscured member.

By way of non-limiting example, in FIG. 3, the sensor elements 160c-160e are shown over the obscured feature 20. The sensor element 160d is disposed over or nearly over the center of the obscured feature 20 and is sending a signal of a first signal strength to the controller 120. The sensor elements 160c and 160e are located near or at an edge of the obscured feature 20 and each is sending to the controller 120 a signal of a second signal strength less than the first strength. The controller 120 controls each respective LED 130c-130e to become energized corresponding to the signal strength received from the relevant sensor elements 160c-160e. The LED 130d, corresponding to the sensor element 160d is energized to a first luminance 140 in a first color; the LEDs 130c and 130e, corresponding respectively to the sensor elements 160c and 160e, are energized to a second luminance 142 and 144 less than the first luminance 140 and in a different color than the first luminance.

The power table 170 reflects relative energization level (hereafter, "power state" 170a-170g for each of the LEDs 130a-130g for the OFD 100 as shown in FIG. 3. In one embodiment, a power state 170a-170g may reflect an amount of electrical energy being delivered. In one embodiment, a power state 170a-170g may reflect a control signal being delivered. In one embodiment, a power state 170a-170g may reflect a combination of electrical power and a control signal. A baseline power state 170a corresponds to first LED 130a and may reflect either a low or no power state. A first power state 170d corresponds to the luminance 140 of the LED 130d in response to the signal strength of the sensor element 160d that is located directly over the center of the obscured structure 20. Similarly, a second power state 170c and 170e corresponds to the second luminance 142 and 144 for the LEDs 130c and 130e in response to the signal strength of the sensor elements 160c and 160e located near an edge of the obscured feature 20. The LEDs 130a-130g, with the first luminance 140, second luminance 142 and 144, are each an example of a variable output display element, according to one embodiment of the present disclosure. Stated otherwise, in one embodiment, the display elements 130a-130g of the variable output display 130 may vary in direct proportion to a strength of a sensor reading. For example, display elements which correspond with the first power state 170d may have a luminance with a first color and/or brightness while display elements which correspond with the second power state 170c and/or 170e may have a luminance with a second color and/or brightness. Additionally, controller 120 may be configured to activate the variable output display 130, or distinct LEDs 130a-130g or the variable output display 130 with more than one level of sensitivity (or in response to more than one level of signal strength from one or more of the sensor elements 160a-160g). In one embodiment, the sensitivity may manually selectable or adjustable by a user of the OFD 300.

Figure 4:
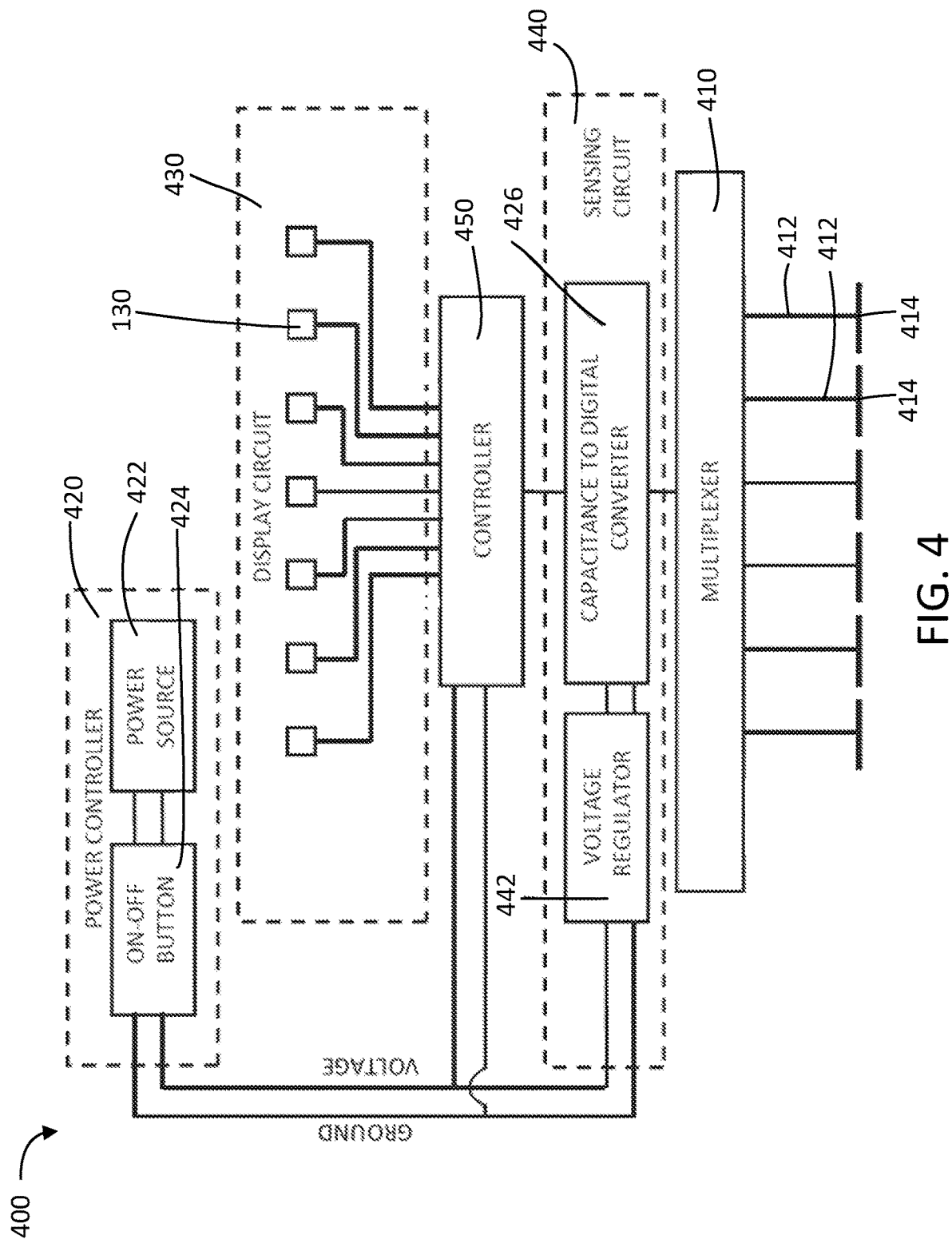
FIG. 4 is a diagram of a circuit of an obscured feature detector, according to an example embodiment.

FIG. 4 is a diagram of an OFD circuit 400, according to an embodiment of the present disclosure. The circuit 400 includes a multiplexer 410, a power controller 420, a display circuit 430, a sensing circuit 440, and a controller 450.

The power controller 420 may include a power source 422 and an on-off button 424. The power source 422 can comprise an energy source for powering the LEDs 130 and supplying power to a capacitance-to-digital converter 426, and the controller 450. In some embodiments, the power source 422 can comprise a DC battery supply. The on-off switch 424 can be used to activate the controller 450 and other components of the OFD 100. In some embodiments, the on-off switch 424 comprises a push-button mechanism that activates components of the OFD 100 for a selected time period. In some embodiments the push button activates the components such that the components remain activated until the button is released. In some embodiments the on-off switch 424 comprises a capacitive sensor that can sense the presence of a finger or thumb over the button. In some embodiments, the on-off switch 424 can comprise a toggle switch or other types of buttons or switches.

The display circuit 430 may include one or more LEDs 130 that are electronically coupled to the controller 450.

The sensing circuit 440 may include a voltage regulator 442 and the capacitance-to-digital converter 426. In some embodiments, as shown in FIG. 4, the sensing circuit 440 comprises a plurality of sensors, the voltage regulator 442, and the capacitance-to-digital converter 426. The voltage regulator 442 may be used to condition the output of the power controller 450, as desired. In some embodiments the voltage regulator 26 is placed as near as possible to the capacitance-to-digital converter 426, which may provide a better power source 422 to the capacitance-to-digital converter 426. The sensing circuit 440 can be electrically coupled to the controller 450. One or more sensor plate traces 412, or electrically conductive paths on the PCB, may connect the individual sensor plates 414 to the capacitance-to-digital converter 426. The connection of the sensor plates 414 to the capacitance-to-digital converter 426 may be made via the multiplexer 410. The multiplexer 410 can individually connect the sensor plates 414 to the capacitance-to-digital converter 426.

In some embodiments the multiplexer 410 may connect a single sensor plate 414 to the sensing circuit 440. In some embodiments, the multiplexer 410 may connect more than one adjacent sensor plate 414 to the sensing circuit 440. In some embodiments, the multiplexer 410 may connect more than one non-adjacent sensor plate 414 to the sensing circuit 440. In some embodiments, the multiplexer 410 is configured so that the sensing circuit 440 measures the capacitance of one sensor plate 414. In some embodiments, the multiplexer 410 is configured so that the sensing circuit 440 measures the aggregate capacitance of two or more sensor plates 414. Each individual sensor plate 414 of a group 7 can be independently connected to the capacitance-to-digital converter 426 via the multiplexer 410. In some embodiments, the group of 7 sensor plates 414 itself is composed of layers of copper on a PCB.

In some embodiments a two-layer PCB is configured as a sensor plate board. In some embodiments a first layer of the sensor plate board comprises the sensor plates 414, and a second layer of the sensor plate board comprises a shield. In some embodiments, the shield is composed of a layer of copper that covers the entire surface of the second layer of the PCB. In some embodiments the layer of copper is covered with a non-conductive layer of soldermask. In some embodiments there are holes in the layer of soldermask. In some embodiments, the holes in the layer of soldermask comprise solder pads that are suitable for making solder bonds.

In some embodiments a four-layer PCB is configured as an interconnection board that has interconnections suitable for connecting circuitry components. In some embodiments the interconnection board is configured with four layers of interconnections that are suitable for interconnecting the sensing circuit 440, the controller 450, and the display circuit 430. In some embodiments one side of the PCB is configured for mounting components, and a second side of the PCB is configured with solder pads.

In some embodiments the sensor plates 414 are arranged on a first PCB. In some embodiments the interconnection circuitry is arranged on a second PCB. In some embodiments the first PCB is bonded to the second PCB.

In some embodiments there are solder pads on the sensor plate board that are complementary with solder pads on an interconnection board. In some embodiments the sensor plate board and the interconnection board may be stacked on top of one another and bonded to each other. In some embodiments the bonding agent that bonds the two PCBs together may be solder. In some embodiments solder paste may be used to bond two PCBs together. In some embodiments, they may be bonded together with solder and the process to bond them together may be standard SMT (surface mount technology) processes. The standard SMT process may include using a stencil to place solder paste in the desired locations. The SMT process may include placing one PCB on top of another. In some embodiments pins may be used to ensure proper alignment of the two PCBs. In some embodiments the final step of the SMT process may involve running the stacked PCBs through a reflow oven.

In some embodiments the sensor plates 414, shield, and circuitry are placed on a single PCB. In some embodiments a six-layer PCB is used. In some embodiments the bottom layer, which is the sixth layer, of the PCB is configured with the sensor plates 414. The fifth layer may be an active shield. The top four layers may connect the balance of the circuitry.

In some embodiments the sensor plates 414, shield, and circuitry are placed on a single PCB. In some embodiments a four-layer PCB is used. First and second layers of the PCB are configured with interconnection circuitry. In some embodiments the bottom layer, which is the fourth layer, of the PCB is configured with the sensor plates 414. The third layer may be an active shield.

The PCB can be made from a variety of suitable materials, such as, for example, FR-4, FR-406, or more advanced materials used in radio frequency circuits, such as Rogers 4003C. Rogers 4003C, and other radio-frequency-class PCB substrates, may offer improved performance across a broader temperature and humidity range.

As used herein, the term "module" can describe any given unit of functionality that can perform in accordance with one or more embodiments of the present invention. For example, a module might by implemented using any form of hardware or software, or a combination thereof, such as, for example, one or more processors, controllers 450, ASICs, PLAs, logical components, software routines, or other mechanisms.

Different processes of reading a capacitance and converting it to a digital value, also known as a capacitance-to-digital conversion, are well-described in the prior art. The many different methods are not described here, and the reader is referred to the prior art for details about different capacitance-to-digital converter methods. Some embodiments use a sigma-delta capacitance-to-digital converter, such as the one that is built into the Analog Devices AD7747 integrated circuit. Some embodiments use a charge-sharing method of capacitance-to-digital conversion.

In some embodiments the voltage regulator 442 may comprise the ADP150-2.8 from Analog Devices, or the NCP702 from ON Semiconductor, which provide very low noise. In some embodiments, the controller 450 may comprise the C8051F317 from Silicon Laboratories, or any of many other microcontrollers.

Detecting obscured features (such as obscured feature 20) can require a high degree of accuracy, and may require more accuracy than the capacitance-to-digital converter 426 may be able to provide, if the native capacitance-to-digital converter 426 sensor readings are used alone. Native sensor readings are the raw values read from the capacitance-to-digital converter 426; they are the digital output of the capacitance-to-digital converter 426.

Some embodiments perform native reads multiple times, and combine the results of the multiple native reads, to create a reading. Some embodiments perform native reads multiple times, and combine the results of the multiple native reads, using a different configuration for two or more of the native reads to create a reading. Some embodiments perform native reads multiple times, and sum or average the results of the multiple native reads, to create a reading. In some embodiments this improves the signal-to-noise ratio. Each native read may involve reading one sensor plate 414. A native read could also involve reading a plurality of sensor plates 414, if multiple sensor plates 414 are multiplexed to the capacitance-to-digital converter 426. In some embodiments multiple native reads are combined to create a reading.

Summing or averaging multiple native reads may improve the signal-to-noise ratio, but may not reduce the effect of non-linearities in the capacitance-to-digital converter 426. The ideal capacitance-to-digital converter 426 is perfectly linear, which means that its native sensor readings increase in direct proportion to an increase in the capacitance being sensed. However, many capacitance-to-digital converters 426 may not be completely linear, such that a change in the input capacitance does not result in an exactly proportional increase in the native reading. These non-linearities may be small, but when a high degree of accuracy is desired it may be desirable to implement methods that reduce the effects of the non-linearities.

In some embodiments, the ill effects of the non-linearities may be mitigated by summing multiple native reads, using a slightly different configuration for each of the native reads. Some embodiments perform native reads using two or more different configurations.

For example, the bias current is one parameter that can be altered to create different configurations. The bias current could be set to normal, or normal+20%, normal+35%, or normal+50%. Different bias currents produce different native sensor readings, even if all other factors remain constant. Since each native reading has a different value, presumably each native reading may be subject to different non-linearities. Presumably summing or averaging sensor readings that are subject to different non-linearities may cause the non-linearities to partially cancel each other out, instead of being summed or multiplied.

In some embodiments there are two separate and independent capacitance-to-digital converters 426. In some embodiments each of them may have different non-linearities. Using both of the capacitance-to-digital converters 21, using the first converter for some of the reads and using the second converter for some of the reads, may mitigate the effect of any single non-linearity. Some embodiments perform native reads on each of the sensor plates 5 using each of twelve different configurations.

After completing the sensor readings, in some embodiments, two different calibration algorithms may be performed: first an individual-plate calibration that adjusts for individual sensor plate 414 variations, and second a surface material calibration that adjusts the sensor readings so that they are tuned to the surface density/thickness. Other embodiments may only use one of the two calibration algorithms. Some embodiments may use other calibration algorithms. In some embodiments the calibration algorithms are performed by a calibration module.

In some embodiments, individual plate calibration is employed first. With individual plate calibration, each sensor plate 414 may have its own individual calibration value. In some embodiments, after the sensor readings are taken, an individual plate calibration value is added to, or subtracted from, each of the sensor readings. Other embodiments may use multiplication, division, or other mathematical functions to perform the individual plate calibration. In some embodiments, the individual plate calibration value is stored in non-volatile memory. Individual plate calibration compensates for individual sensor plate 414 irregularities, and is used to compensate for these irregularities. In some embodiments it is presumed that after performing individual plate calibration that the sensor readings will presumably have the same calibrated values, if the sensor plate sensor readings are taken while the OFD 100 is on the surface that is similar to the surface the obscured feature detector 100 was calibrated on. For example, if sensor readings are performed on ½" sheetrock 2, without any obscured features present, and the individual calibration values were created for ½" sheetrock 2, then after performing individual plate calibration, it is presumed that all the sensor readings would be corrected to a common value. If sensor readings are performed on a thicker material (such as ⅝" sheetrock 2), a thinner material (such as ⅜" sheetrock 2) or a different material (such as ¾" plywood) then there may be some error in the values. Surface material calibration may help correct this error. In some embodiments surface material calibration may be used.

In some embodiments, after calibrating the sensor plate sensor readings the obscured feature detector 100 decides if an obscured feature is present. In some embodiments the lowest sensor plate reading is subtracted from the highest sensor plate reading. If the difference is greater than a threshold value then a determination is made that an obscured feature is present. If it is determined that no obscured features are present, then all of the LEDs 130 may be deactivated. If an obscured feature is present then the obscured feature detector 100 begins the process of determining the position(s) and width(s) of the obscured feature(s).

In some embodiments pattern matching may be employed to determine which LEDs to activate. In some embodiments a pattern matching module is used to determine the locations of the obscured feature. The pattern matching module compares the calibrated and scaled sensor readings from the sensor plates 414 to several predetermined patterns. The pattern matching module determines which predetermined pattern best matches the sensor readings. Then the set of LEDs that corresponds to the best matching pattern is activated. Additional details about pattern matching are discussed in the prior art, such as in U.S. Pat. No. 8,884,633. Those details will not be repeated here; instead the reader is encouraged to refer to them directly.

In some embodiments the obscured feature detector 100 comprises a single capacitance-to-digital converter 426. In some embodiments the sensor plates 414 may be individually connected to the capacitance-to-digital converter 426. In some embodiments the sensor plates 414 may be individually connected to the capacitance-to-digital converter 426 via the multiplexer 410. In some embodiments more than one sensor plate 414 may be connected to the capacitance-to-digital converter 426 at a time. In some embodiments multiple adjacent sensor plates 414 may be electrically connected to the capacitance-to-digital converter 426. In some embodiments multiple non-adjacent sensor plates 414 may be connected to the capacitance-to-digital converter 426. The use of a multiplexer 410 to connect sensor plates 414 to a single capacitance-to-digital converter 426 may improve sensor plate 414 to sensor plate 414 consistency of the sensor readings, because the sensor readings from each of the sensor plates 414 may be equally affected by variations to the capacitance-to-digital converter 426. Factors that may affect the sensor readings from the capacitance-to-digital converter 426 may include, but are not limited to, process variations, temperature variations, voltage variations, electrical noise, aging, and others.

In some embodiments, the sensor plate traces 412 are routed such that each of the sensor plate traces 412 has substantially equal capacitance, resistance, and inductance. In some embodiments it is desirable for each of the sensor plate traces 412 to have the same electrical properties, so that each of the sensor plates 414 will respond equivalently to the same detected object(s).

In some embodiments each of the sensor plate traces 412 from the capacitance-to-digital converter 426 to each of the sensor plates 414 has substantially the same length. In some embodiments two or more of the sensor plate traces 412 from the capacitance-to-digital converter 426 to the sensor plates 414 have substantially the same length. In some embodiments sensor plate traces 412 with substantially the same length may have more equivalent capacitances, inductances, and resistances. Equal length sensor plate traces 412 may offer enhanced performance because they may improve the uniformity of the sensor readings, such that the sensor plates 414 respond more equivalently to the same detected objects, and may provide more immunity from environmental conditions, such as temperature and humidity.

In some embodiments each of the sensor plate traces 414, which comprises electrically conductive paths, has substantially the same width. In some embodiments, both the width and the length of each of the sensor plate traces 414 are substantially equivalent. In some embodiments the sensor plate traces 414 will have more than one segment. For example, a first segment of the traces may route the sensor plate traces 414 from a capacitance-to-digital converter 21 to a via. The via may take the sensor plate trace 412 to a different layer of the PCB, where there may be a second segment of the sensor plate trace 412. In some embodiments all of the sensor plate traces 412 will have the same length and width, in each segment, as the other traces in that segment. In some embodiments two or more of the sensor plate traces 412 will have the same width throughout a first segment. In some embodiments two or more of the sensor plate traces 412 will have the same width throughout a second segment. In some embodiments two or more of the sensor plate traces 412 will have the same length throughout a first segment. In some embodiments two or more of the sensor plate traces 412 will have the same length throughout a second segment.

In some embodiments the sensor plate traces 412 comprise multiple segments. In some embodiments a segment of a sensor plate trace 412 may be the wire bonds that are within the package of an integrated circuit that route the signals from the piece of silicon to the pins of the integrated circuit package. In some embodiments a segment of a sensor plate trace 412 may comprise a layer of copper on a first layer of a PCB. In some embodiments a segment of a sensor plate trace 412 may comprise a layer of copper on a second layer of a PCB.

In some embodiments the capacitance-to-digital converter 426 will read the sum of the capacitance on the sensor plates 414 and the capacitance on the sensor plate traces 412. In some embodiments, only detecting the sensor readings on the sensor plates 414, and not detecting the sensor plate traces 412, may be preferable. However, because the sensor plates 414 and sensor plate traces 412 are electrically coupled, a means of ensuring stable and uniform capacitance on the sensor plate traces 412 may be desired. For example, it may be desirable to configure the sensor plate traces 412 so that their capacitance is uniform and stable. Consequently, it may be preferred for the sensor plate traces 412 to be configured so that the sensor plate traces 412 do not change. In some embodiments it may be preferred that the sensor plate traces 412 do not change relative to each other, such that any change in the capacitance on one sensor plate trace 412 is reflected in each of the sensor plate traces 412.

In some embodiments it may be advantageous to shield the sensor plate traces 412. Sensor plate trace shielding may protect the sensor plate traces 412 from external electromagnetic fields. In some embodiments shielding the sensor plate traces 412 may also advantageously provide a more consistent environment for the sensor plate traces 412 by helping to ensure that each of the sensor plate traces 412 has an environment that is similar to each of the other sensor plate traces 412.

In some embodiments each of the sensor plate traces 412 from the capacitance-to-digital converter 426 to each of the sensor plates 414 has substantially the same surroundings. In some embodiments the sensor plate traces 412 are routed sufficiently far apart so that capacitive and inductive coupling between the sensor plate traces 412 is minimized, and may improve consistency because each of the sensor plate traces 412 may have surroundings that are more similar to the other sensor plate traces 412. In some embodiments each of the sensor plate traces 412 is shielded on one or both sides with an active shield trace.

In some embodiments a user may be electrically coupled to the sensing circuit 440. In some embodiments the quality of the sensor readings is increased when an electrically conductive point of the sensing circuit 440 is coupled to the user. Electrically coupling the user to the sensing circuit 440 may provide a stationary voltage level for the sensing circuit 440 and may result in higher quality sensor readings that have higher sensitivity. For example, a prior art obscured feature detector that drives the sensor plates 414 with a 3.0V may in reality only drive the sensor plates 414 with a 3.0V signal relative to ground. However, if the ground is floating, then driving the sensor plates 414 with 3.0V could result in a 1.5V signal on the sensor plates 414 and a -1.5V signal on the ground. In some embodiments the quality of the sensor readings is not increased when an electrically conductive point of the sensing circuit 440 is coupled to the user.

In some embodiments electrically coupling the user to the sensing circuit 440 may result in higher absolute voltage swings on the sensor plates 414, which may be due in part to the sensing circuit 440 being held at a stable level. In some embodiments electrically coupling the user to the sensing circuit 440 may also result in sensor readings that are more consistent.

In some embodiments the user is electrically coupled to the ground of the sensing circuit 440, as shown in FIG. 4. In some embodiments the user is electrically coupled to the voltage source of the sensing circuit 440. In some embodiments the user is electrically coupled to a different electrically conductive point of sensing circuit 440.

In some embodiments the hand of the user may be electrically coupled to the sensing circuit 440 by making direct contact with the sensing circuit 440. In some embodiments an electrically conductive material, such as a wire, may electrically couple the hand of the user to the sensing circuit 440. In some embodiments the button, which the user would need to touch to activate the obscured feature detector 100, may comprise an electrically conductive material which may be electrically coupled to the sensing circuit 440. In some embodiments the button may comprise aluminum or another electrically conductive material such as tin-plated steel. In some embodiments an aluminum button may be anodized, which may provide pleasing cosmetics.

In some embodiments the housing 110 (see FIG. 1) of the obscured feature detector 100 may comprise an electrically conductive material, such as an electrically conductive plastic. In some embodiments only a portion of the housing 110 may comprise electrically conductive plastic. The electrically conductive housing, or a portion of the electrically conductive housing, may be coupled to an electrically conductive point in the sensing circuit 440, thereby coupling the user to the sensing circuit 440.

In some embodiments mixing carbon black with the plastic resin may provide electrically conductive properties. Many thermoplastics, including polypropylene and polyethylene, become electrically conductive when a carbon black is mixed into the plastic resin. In some embodiments the conductivity increases as the concentration of carbon black is increased, advantageously making it possible to control the conductivity of the plastic. In some embodiments a plastic with a conductivity that is less than about 25,000 ohms-cm provides sufficiently high conductivity to effectively couple the user to the sensing circuit 440. In some embodiments a higher degree of conductivity may be desired. In some embodiments a lower degree of conductivity may be desired. In some embodiments it is advantageous for the user to be coupled to the sensing circuit by a path with less than about 50 mega-ohms.

In some prior art obscured feature detectors, a change in the position of the hand of the user can cause a change in the sensor readings. This may occur in some prior art obscured feature detectors because the hand may form a portion of the path between the sensor plates 414 and ground. As a result, a change in hand position can cause a change in the sensor readings of the sensor plates 414. Disadvantageously, this may reduce the accuracy of the sensor readings.

If it were possible for the size and position of the hand of the user to be constant, it may be possible to do a calibration adjustment to mathematically remove the effect of the hand of the user from the raw sensor readings. However, in practice this may not be feasible. In practice the size, shape, and position of hands of different users may vary too much to make a calibration adjustment practically possible. To improve performance in light of the aforementioned issues, in some embodiments a conductive hand guard may be positioned between the hand of the user and the sensor plates 414. In some embodiments the hand guard may be grounded to the sensing circuit 440, as illustrated in FIG. 4.

Figure 5:
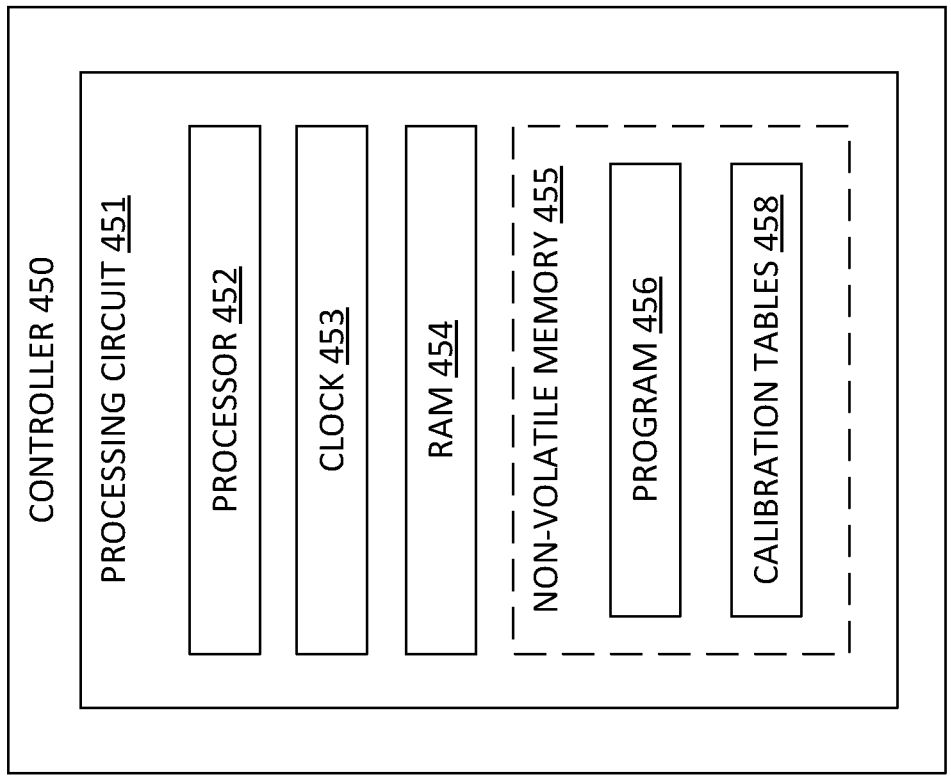
FIG. 5 is a diagram of a controller of an obscured feature detector, according to one embodiment.

FIG. 5 is a diagram of the controller 450, according to one embodiment. The controller 450 includes a processing circuit 452 having a processor 452 and non-volatile memory 455. The processing circuit 451 may be structured or configured to execute or implement the instructions, commands, and/or control processes described herein with respect to the controller 450. The depicted configuration represents the processing circuit 451 as instructions stored in non-transitory machine or computer-readable media. However, as mentioned above, this illustration is not meant to be limiting as the present disclosure contemplates other embodiments the processing circuit 451 is configured as a hardware unit. All such combinations and variations are intended to fall within the scope of the present disclosure. The controller 450 includes a processor 452, a clock 62, random access memory (RAM) 64, a non-volatile memory 65, and/or another computer-readable medium. The non-volatile memory 65 may include a program 66 (e.g., in the form of program code or computer-executable instructions for performing operations) and calibration tables 68. In operation, the controller 60 may receive the program 66 and may synchronize the functions of the capacitance-to-digital converter 21 and the display circuit 25 (see FIG. 4). The non-volatile memory 65 receives and stores the program 66 as well as look-up tables (LUT) and calibration tables 68. The program 66 can include a number of suitable algorithms, such as, for example, an initialization algorithm, a calibration algorithm, a pattern-matching algorithm, a multiplexing algorithm, a display management algorithm, an active sensor activation algorithm, and a non-active sensor management algorithm.

The processor 452 may be one or more of a single- or multi-chip processor, a digital signal processor (DSP), an application specific integrated circuit (ASIC), a field programmable gate array (FPGA), or other programmable logic device, discrete gate or transistor logic, discrete hardware components, another type of suitable processor, or any combination thereof designed to perform the functions described herein. In this way, the processor 452 may be a microprocessor, a state machine, or other suitable processor. The processor 452 also may be implemented as a combination of computing devices, such as a combination of a DSP and a microprocessor, a plurality of microprocessors, one or more microprocessors in conjunction with a DSP core, or any other such configuration. The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. In another configuration, the processing circuit 451 may be embodied as one or more circuitry components including, but not limited to, processing circuitry, network interfaces, peripheral devices, input devices, output devices, etc. In some embodiments, the processing circuit 451 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the processing circuit 451 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The memory 455 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory 455 may include a program 456 (e.g., in the form of program code or computer-executable instructions for performing operations) and calibration tables 458. In operation, the controller 450 may receive the program 456 and may synchronize the functions of the capacitance-to-digital converter 426 and the display circuit 430 (see FIG. 4). The non-volatile memory 455 receives and stores the program 456 as well as look-up tables (LUT) and calibration tables 458. The program 456 can include a number of suitable algorithms, such as, for example, an initialization algorithm, a calibration algorithm, a pattern-matching algorithm, a multiplexing algorithm, a display management algorithm, an active sensor activation algorithm, and a non-active sensor management algorithm. The memory 455 may be communicably coupled to the processor 452 to provide computer code or instructions to the processor 452 for executing at least some of the processes described herein. Moreover, the memory 455 may be or include tangible, non-transient volatile memory or non-volatile memory. Accordingly, the memory 455 may include database components, object code components, script components, or any other type of information structure for supporting the various activities and information structures described herein.

EXAMPLES

Example 1. An obscured feature detector comprising: a plurality of sensor plates, each having a capacitance that varies based on the proximity of the sensor plate to one or more adjacent objects and a material property (e.g., a dielectric constant) of the one or more adjacent objects; a sensing circuit coupled to the plurality of sensor plates, the circuit being configured to measure the capacitances of each of the sensor plates; a plurality of indicators, each indicator capable of being toggled between a deactivated state and an activated state; a controller coupled to the sensing circuit, the controller to analyze the capacitances measured by the sensing circuit to identify a first edge of an obscured feature and a centerline of the obscured feature, wherein the obscured feature is obscured behind a surface, and wherein the one or more adjacent objects includes the obscured feature and the surface, the controller also coupled to the plurality of indicators, the controller to simultaneously (or concurrently) toggle one or more of the plurality of indicators to a first activated state to indicate detection of (e.g., a proximity of the obscured feature detector to) the first edge of the obscured feature and to toggle another indicator of the plurality of indicators to a second activated state to indicate the centerline of the obscured feature.

Example 2. The obscured feature detector of Example 1, the controller further to analyze the capacitances measured by the sensing circuit to identify a second edge of the obscured feature, wherein the controller is further to toggle a third indicator of the plurality of indicators to the first activated state to indicate proximity to the second edge of the obscured feature simultaneously (or concurrently) with indicating the centerline and proximity to the first edge, wherein the second edge is an opposing edge of the first edge.

Example 3. The obscured feature detector of Example 1, wherein the plurality of sensor plates comprises a center sensor plate, a first lateral sensor plate, and a second lateral sensor plate (opposite the first lateral sensor plate relative to the center sensor plate), wherein the controller identifies the centerline of the obscured feature by analyzing the capacitances measured by the sensing circuit to identify when the measured capacitance of the center sensor plate is greater than the measured capacitances of the first lateral sensor plate and the second lateral sensor plate and when the measured capacitances of the first lateral sensor plate the second lateral sensor plate are in a balanced state.

Example 4. The obscured feature detector of Example 3, wherein the controller toggles the another indicator to the second activated state when the measured capacitances of the first lateral sensor plate the second lateral sensor plate are in a balanced state.

Example 5. An obscured feature detector comprising: a center sensor plate, a left sensor plate, and a right sensor plate, each having a capacitance that varies based on: (a) the proximity of the sensor plate to one or more surrounding objects, and (b) the dielectric constant(s) of the surrounding object(s); a sensing circuit coupled to each of the sensor plates, the circuit being configured to measure the capacitances of each of the sensor plates; a controller coupled to the sensing circuit, the controller being configured to analyze the capacitances measured by the sensing circuit to identify opposing edges of an obscured feature obscured by a surface and to identify a centerline of the obscured feature; a first lateral indicator and a second lateral indicator coupled to the controller and capable of toggling between a deactivated state and a first activated state, wherein the controller activates the first lateral indicator and the second lateral indicator to toggle to the first activated state to indicate the opposing edges of the obscured feature; and a centerline indicator coupled to the controller and capable of toggling between a deactivated state and a second activated state, wherein the controller activates the centerline indicator to toggle to the second activated state to indicate the centerline of the obscured feature simultaneously (or concurrently with activating the first lateral indicator and the second lateral indicator).

Example 6. The obscured feature detector of Example 5, further comprising: a plurality of indicators coupled to the controller, including the first lateral indicator, the second lateral indicator, and the centerline indicator, each indicator of the plurality of indicators capable of toggling between the deactivated state and the first activated state, wherein the controller is configured to activate one or more of the plurality of indicators to toggle to the first activated state to identify a region of relative high capacitance.

Example 7. The obscured feature detector of Example 5, wherein the controller identifies the centerline of the obscured feature by analyzing the capacitances measured by the sensing circuit to identify when the measured capacitance of the center sensor plate is greater than the measured capacitances of the first lateral sensor plate and the second lateral sensor plate and when the measured capacitances of the first lateral sensor plate the second lateral sensor plate are in a balanced state.

Example 8. An obscured feature detector comprising: a plurality of obscured feature sensing elements to sense an obscured feature obscured behind a surface; an obscured feature indicator to indicate to a user a leading edge of an obscured feature obscured by a surface and a centerline of the obscured feature; and obscured feature sensing circuitry operatively coupled to the plurality of obscured feature sensing elements, the obscured feature sensing circuitry to measure a sensor reading on each sensing element of the plurality of obscured feature sensing elements, the obscured feature sensing circuitry further to analyze the sensor reading of each sensing element to identify the leading edge of an obscured feature and to identify the centerline of the obscured feature, the obscured feature sensing circuitry coupled to the obscured feature indicator to activate the obscured feature indicator to indicate the leading edge and the centerline.

Example 9. An obscured feature detector comprising: a housing having a top, a bottom, and an interior cavity, with a handle located near the top, the housing being configured to be placed against a surface to detect the presence of one or more features obscured by the surface; a plurality of sensor plates arranged in an array at the bottom of the housing, wherein a center sensor plate sensor plate of the plurality of sensor plates is disposed between a left sensor plate and a right sensor plate of the plurality of sensor plates, each sensor plate of the plurality of sensor plates having a capacitance that varies based on: (a) the proximity of the sensor plate to one or more surrounding objects, and (b) the dielectric constant(s) of the surrounding object(s); a sensing circuit located in the interior cavity of the housing and coupled to each of the sensor plates, the sensing circuit being configured to transmit a charge to each of the sensor plates and to read the capacitances of each of the sensor plates; a controller disposed within the interior cavity of the housing and coupled to the sensing circuit, the controller being configured to analyze the capacitances read by the sensing circuit to identify when the read capacitance of a center sensor plate of the plurality of sensor plates is greater than the read capacitance of a left sensor plate of the plurality of sensor plates that is adjacent to the center sensor plate and greater than the read capacitance of a right sensor plate of the plurality of sensor plates that is adjacent to the center plate and to identify when the read capacitances of the left sensor plate and the right sensor plate are in a balanced state; and a center indicator located near the top of the housing and coupled to the controller, wherein the controller is configured to control the center indicator to identify the center of the one or more features obscured by the surface when the read capacitances of the left and right sensor plates are in the balanced state.

Example 10. A method of providing obscured feature detection, comprising: providing an obscured feature detector to be placed on a surface to detect an obscured feature obscured by the surface, the obscured feature detector having a plurality of sensor plates arranged in an array (including a center sensor plate, a left sensor plate, and a right sensor plate); measuring, via a sensing circuit, capacitance readings sensed by the sensor plates in a plurality of regions, each region corresponding to an area surrounding one or more of the at least three sensor plates; comparing, by a controller, the sensed capacitance readings in different regions using a controller coupled to the sensing circuit; identifying, via the controller, an edge of the obscured feature and a centerline of the obscured feature, based on the comparison of the sensed capacitance readings; and activating, via the controller, an edge indicator to indicate (e.g., to a user) the edge of the obscured feature and a center indicator to indicate (e.g., to a user) the center of the obscured feature.

Example 11. The method of Example 10, wherein the identifying, via the controller, the edge of the obscured feature and the centerline of the obscured feature comprises identifying one region of relative high capacitance from the capacitance reading of a center sensor plate of the plurality of sensor plates and two regions of relatively lower capacitance from the capacitance readings of the other sensor plates of the plurality of sensor plates.

Example 12. The method of Example 11, wherein the activating, via the controller, comprises activating the center indicator when the two regions of relatively lower capacitance are substantially balanced.

Example 13. A method of detecting a center of an obscured feature behind a surface, comprising: providing an obscured feature detector to be placed on a surface to detect an obscured feature obscured by the surface, the obscured feature detector having at least three sensor plates arranged in an array, including a center sensor plate, a left sensor plate, and a right sensor plate; measuring, via a sensing circuit, capacitance readings sensed by the sensor plates in a plurality of regions, each region corresponding to an area surrounding one or more of the at least three sensor plates; comparing, by a controller, the sensed capacitance readings in different regions using a controller coupled to the sensing circuit; identifying, via the controller, one region of relative high capacitance from the capacitance reading of the center sensor plate and two regions of relatively lower capacitance from the capacitance readings of the left and right sensor plates; and activating, via the controller, a center indicator when the two regions of relatively lower capacitance are substantially balanced.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the apparatus and system as shown in the various exemplary embodiments is illustrative only. Additionally, any element disclosed in one embodiment may be incorporated or utilized with any other embodiment disclosed herein.

What is claimed:

1. An obscured feature detector comprising:
a plurality of sensor plates, each having a capacitance that varies based on proximity of the sensor plate to one or more adjacent objects and a material property of the one or more adjacent objects;
a sensing circuit coupled to the plurality of sensor plates, the circuit being configured to measure the capacitances of each of the sensor plates;
a plurality of indicators, each indicator capable of being toggled between a deactivated state and an activated state; and
a controller coupled to the sensing circuit, the controller configured to analyze the capacitances measured by the sensing circuit to identify an obscured feature and a centerline of the obscured feature, wherein the controller is also coupled to the plurality of indicators, the controller to toggle one or more of the plurality of indicators to a first activated state to indicate detection of the obscured feature and to toggle another indicator of the plurality of indicators to a second activated state to indicate the centerline of the obscured feature.

2. The obscured feature detector of claim 1, wherein the first activated state is a first color and the second activated state is a second color.

3. The obscured feature detector of claim 1, wherein the first activated state is a first intensity and the second activated state is a second intensity.

4. The obscured feature detector of claim 3, wherein the second intensity is greater than the first intensity.

5. The obscured feature detector of claim 1, wherein the controller toggles the another indicator to the second active state when two of the sensor plates are in a balanced state.

6. An obscured feature detector comprising:
a plurality of sensor plates, each having a capacitance that varies based on the proximity of the sensor plate to one or more adjacent objects and a material property of the one or more adjacent objects;
a sensing circuit coupled to the plurality of sensor plates, the circuit being configured to measure the capacitances of each of the sensor plates;
a plurality of indicators, each indicator capable of being toggled between a deactivated state and an activated state;
a controller coupled to the sensing circuit, the controller to analyze the capacitances measured by the sensing circuit to identify the location of an obscured feature;
the controller also coupled to the plurality of indicators, the controller to toggle one or more indicators that are located in front of the obscured feature to a first activated state to indicate proximity of the obscured feature detector to the obscured feature; and
the controller also coupled to a centerline indicator, the controller to toggle the centerline indicator to a second activated state when the obscured feature detector is centered on the obscured feature detector.

7. The obscured feature detector of claim 6, wherein the centerline indicator is one of the plurality of indicators and wherein the controller activates the centerline indicator to the first activated state to indicate that the indicator is in front of the obscured feature, and activates the centerline indicator to the second activated state to indicate that the obscured feature detector is centered on the obscured feature.

8. The obscured feature detector of claim 7, wherein the first activated state comprises a first intensity to indicate that the centerline indicator is in front of the obscured feature, and the second activated state comprises a second intensity to indicate that the centerline indicator is centered on the obscured feature.

9. The obscured feature detector of claim 7, wherein the first activated state comprises a first shape to indicate that the centerline indicator is in front of the obscured feature, and the second activated state comprises a second shape to indicate that the centerline indictor is centered on the obscured feature.

10. The obscured feature detector of claim 7, wherein the first activated state comprises a first color to indicate that the centerline indicator is in front of the obscured feature, and the second activated state comprises a second color to indicate that the centerline indictor is centered on the obscured feature.

11. The obscured feature detector of claim 7, wherein the first activated state comprises a first luminance in a first color to indicate that the centerline indicator is in front of the obscured feature, and the second activated state comprises a second luminance in a second color to indicate that the centerline indictor is centered on the obscured feature.

12. The obscured feature detector of claim 6, wherein the plurality of indicators are light emitting diodes.

13. The obscured feature detector of claim 6, wherein the plurality of indicators are liquid crystal displays.

14. The obscured feature detector of claim 6, wherein the centerline indicator is distinct from the plurality of indicators.

15. The obscured feature detector of claim 6, wherein the controller determines that the obscured feature detector is centered on the obscured feature when there are similar readings on sensor plates that are located equal distances from a centerline of the obscured feature detector.

16. A method of providing obscured feature detection, comprising:
measuring, via a sensing circuit, capacitance readings sensed by a plurality of sensor plates of an obscured feature detector in a plurality of regions, each region of the plurality of regions corresponding to an area surrounding one or more of the plurality of sensor plates;
comparing, by a controller, the sensed capacitance readings in different regions using a controller coupled to the sensing circuit;
identifying, via the controller, an edge of the obscured feature and a centerline of the obscured feature, based on the comparison of the sensed capacitance readings;
activating simultaneously, via the controller, one or more indicators of a plurality of indicators of the obscured feature detector to indicate proximity of the obscured feature detector to the obscured feature and a centerline indicator of the obscured feature detector to indicate a centerline of the obscured feature.

17. The method of claim 16, wherein the identifying, via the controller, the edge of the obscured feature and the centerline of the obscured feature comprises identifying one region of relative high capacitance from the capacitance reading of a center sensor plate of the plurality of sensor plates and two regions of relatively lower capacitance from the capacitance readings of the other sensor plates of the plurality of sensor plates.

18. The method of claim 17, wherein the activating, via the controller, comprises activating the centerline indicator when the two regions of relatively lower capacitance are substantially balanced.

19. The method of claim 16, wherein the centerline indicator is an indicator of the plurality of indicators, and a first intensity is used to indicate that the indicator is in front of an obscured feature, and a second intensity is used to indicate that the centerline indicator is centered on the centerline of the obscured feature.

20. The method of claim 16, wherein the plurality of indicators are light emitting diodes.

21. The method of claim 16, wherein the centerline indicator is distinct from the plurality of indicators.

* * * * *